Nov. 17, 1953 R. M. SCHULTZ 2,659,278
TRIMMING MACHINE
Filed May 2, 1950 8 Sheets-Sheet 1

Fig.1

INVENTOR.
Roy M. Schultz.
BY
Thiess, Olsen & Mecklenburger
Attys.

Nov. 17, 1953  R. M. SCHULTZ  2,659,278
TRIMMING MACHINE
Filed May 2, 1950  8 Sheets-Sheet 3

Fig 3

INVENTOR.
Roy M. Schultz
BY
Thiess, Olson & Mecklenburgh
Attys

Nov. 17, 1953  R. M. SCHULTZ  2,659,278
TRIMMING MACHINE

Filed May 2, 1950  8 Sheets-Sheet 4

Fig 4.

INVENTOR.
Roy M. Schultz.
BY
Thiess, Olson & Mecklenburger
Attys.

Nov. 17, 1953   R. M. SCHULTZ   2,659,278
TRIMMING MACHINE
Filed May 2, 1950   8 Sheets-Sheet 5

INVENTOR.
Roy M. Schultz.
BY
Hirs, Olson & Mecklenburger
Attys.

Nov. 17, 1953    R. M. SCHULTZ    2,659,278
TRIMMING MACHINE
Filed May 2, 1950    8 Sheets-Sheet 6

INVENTOR.
Roy M. Schultz
BY

Patented Nov. 17, 1953

2,659,278

UNITED STATES PATENT OFFICE 2,659,278

TRIMMING MACHINE

Roy M. Schultz, Chicago, Ill., assignor to Pontiac Engraving & Electrotype Co., Chicago, Ill., a corporation of Illinois Application May 2, 1950, Serial No. 159,635

23 Claims. (Cl. 90—20)

This invention relates to a machine for use in the graphic arts industry, such as in photo-engraving and electrotyping establishments and the like, and is more particularly directed to a machine for trimming wood-mounted printing plates of all kinds to specified dimensions, and also for effecting a smooth, mirror-like finish on the trimmed sides of the mounted plates.

The printing plate herein referred to comprises a thin metallic plate made of either copper, zinc, magnesium material, or any metal alloy commonly used by photo-engravers or electrotypers engaged in the manufacture of such plates. The desired impression to be printed is reproduced on the metallic plate. The plate is mounted by some special adhesive material to a relatively thick backing block which is preferably of wood construction, but may be of any other suitable material such as metal. The wood mounted plate is first saw-cut to its approximate size and then carefully trimmed down to its specified dimensions.

Heretofore the sides of the mounted plate, subsequent to trimming, were left relatively rough and non-exacting in dimension, thus necessitating the operator, when mounting the plate with type in a chase for use on a printing press, to first insert lead spacers between the plate and type in order to compensate for the non-exactness of the plate's dimensions. This operation was time-consuming and required skillful mounting of the plate in the chase by the operator. Furthermore, in trimming the mounted plate a burr was formed on the edge thereof, which all too frequently showed up in printing, or prevented the paper being printed from kissing the surface of the plate so as to effectively transfer the plate's impression to the paper. Thus it was necessary for the burr to be removed by the operator with a hand finishing tool or fine-tooth file prior to locking the plate in the chase. Further difficulty was encountered in prior trimming machines in maintaining the sharpness of the cutting tool. This was due to the fact that the cutting load on the tool was confined to a relatively small area on the periphery of the tool. To rectify this difficulty the tool was raised or lowered relative to the plate, after a certain number of cuts had been made. This tool adjusting operation was objectionable because it was time-consuming. Prior trimming machines were also wanting in safety devices for the protection of the operator, printing plate, and machine as well. Furthermore the accuracy of the cut with prior machines was not satisfactory because of the difficulty and awkwardness encountered by the operator in aligning the mounted plate relative to the cutting tool.

Thus, it is one of the objects of this invention to provide a trimming machine which overcomes the above mentioned difficulties.

It is a further object of this invention to provide a machine having aligning means which enables the operator to quickly set the plate in its proper relative position for cutting.

It is a further object of this invention to provide a machine which does not require the skill of an experienced person to operate.

Further and additional objects will appear from the description, accompanying drawings, and appended claims.

In accordance with one embodiment of this invention a trimming machine is provided comprising a frame, a cutting tool rotatably mounted on said frame and a table or work supporting member pivotally mounted on said frame for forward and rearward movement past said tool. The supported work is adapted to be trimmed by the tool only upon forward movement of the supporting member.

For a more complete understanding of this invention reference should be made to the drawings wherein.

Figure 1:
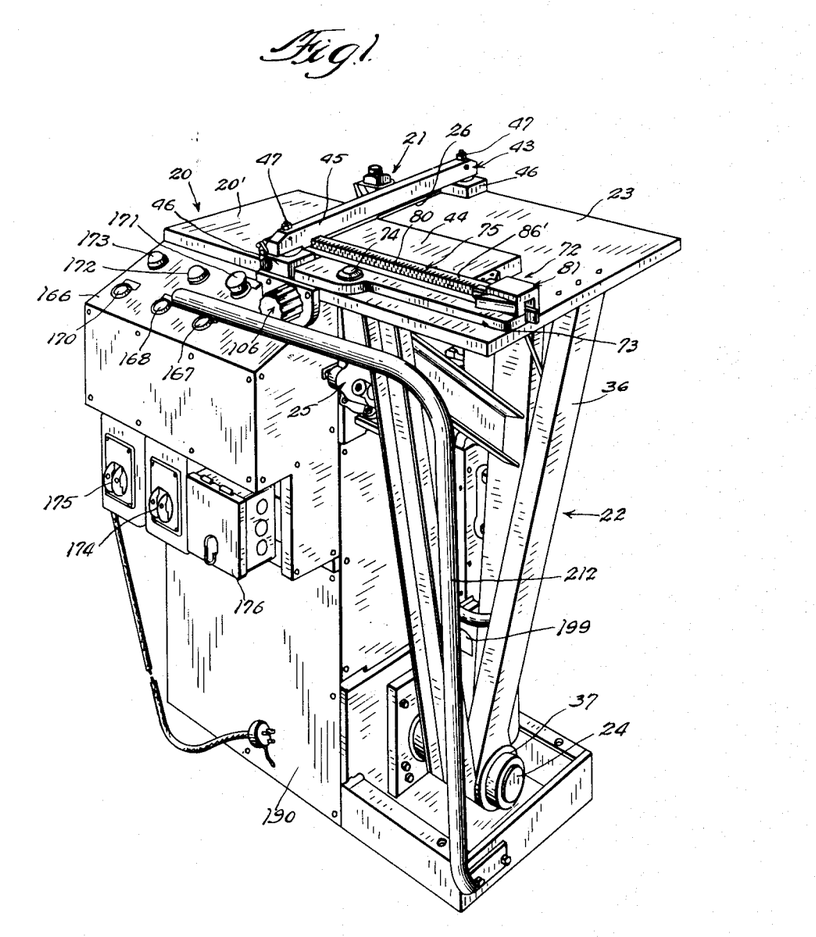
Fig. 1 is a perspective view of the machine showing the work supporting member approximately opposite the cutting tool.

Referring now to the drawings and more particularly to Fig. 1, a trimming machine is shown comprising the following basic parts: a frame 20, a cutting tool or element 21 mounted vertically on said frame and rotatable about its vertical or longitudinal axis, and a work supporting member 22 pivotally mounted on an outwardly extending shaft 24 at the bottom of the frame. The work supporting member 22 has a substantially flat top 23. Member 22 is actuated by piston cylinder assembly 25 for movement in a forward and rearward direction past cutting tool 21 and in a path arcuate with respect to a horizontal plane. The side edge 26 of top 23, which is adjacent cutting tool 21, is disposed in a plane parallel with respect to a tangential or cutting plane of the tool. Spaced from edge 26 and projecting downwardly from the underside thereof is a flange 27 which cooperates with pairs of substantially vertically extending guide rollers 28 and 30. The rollers are disposed on either side of the flange as seen in Fig. 3. The underside 31 of flange 27 is arcuate in shape and corresponds to the arcuate path followed by the work supporting member when actuated by assembly 25, and is adapted to be engaged by a substantially horizontally mounted guide roller 32, see Fig. 2. Guides 28 are rotatably mounted on an adjustable plate 33 which is secured to frame 20 by bolts 33'. Plate 33 may be adjusted vertically by adjusting positioning bolts 34 which engage the bottom edge of plate 33. Bolts 34 are mounted on a suitable block or bracket 35 which extends transversely from frame 20 beneath plate 33.

The advantage of having the member 22 move in an arcuate path is that a greater portion of the periphery of the cutting tool is used when trimming the plate 44. Thus by distributing the cutting load over a greater portion of the periphery of the cutting tool, the life of the tool is increased.

Work supporting member 22 has a plurality of downwardly extending brace members 36 which converge at their lower end and terminate in a hub 37. The hub 37 pivotally embraces horizontally extending shaft 24. As heretofore mentioned, the supporting member 22 is actuated for forward and rearward movement by piston cylinder assembly 25 which is positioned intermediate shaft 24 and tool 21, see Fig. 2. The cylinder housing 39 of assembly 25 is rockably mounted on pin 38 which extends outwardly from frame 20. The exposed end of piston shaft 40 of assembly 25 pivotally engages a pin 42 which is secured to one of brace members 36' by means of a bracket plate 41. When the piston shaft 40 is fully extended, work supporting member 22 is in its extreme forward position A, see Fig. 2. When piston shaft 40 is fully retracted the work supporting member is in its rest, load, or starting position B, see Fig. 2.

Mounted on top 23 and disposed parallel and adjacent to edge 26 is clamp unit 43 which is adapted to hold the printing plate or work 44 firmly against top 23 while being fed past cutting tool 21. The clamp unit 43 comprises an elongated clamp bar 45 which is parallel to edge 26 and is adapted for movement towards or away from top 23. Mounted on top 23 and disposed beneath either end of bar 45 is a rest block 46 which serves as a stop for bar 45 when it is moved to its clamp position.

Projecting downwardly from either end of clamp bar 45 is a shaft 47 which extends through a plurality of coincidently arranged openings 48, 50, and 51 formed in rest block 46, top 23, and flange 27, respectively. The lower end 52 of shaft 47 is reduced in size and is slidably mounted within a reduced opening 53 formed at the lower end of opening or chamber 51. Secured to shaft 47 and disposed within chamber 51 are a plurality of washers which form a piston head 54. Embracing end 52 of shaft 47 is a coil spring 55 having the upper end thereof engaging the underside of piston head 54 and having the lower end thereof engaging a shoulder 56 formed in chamber 51. A fluid inlet and outlet port 57 is formed in the inner surface of flange 27 beneath top 23 for chamber 51. Secured over port 57 is a connector 58 for hydraulic line 59 which will be hereinafter described. Mounted at the upper end of opening 48 and at the lower end of opening 50 are oil seal rings 60 and 61, respectively. Thus, when the clamp bar is actuated to clamping position, oil is pumped through port 57 into the upper portion of chamber 51 and thereby causes the piston head 54 and shaft 47 to be moved downwardly and compress spring 55. To effect release of clamp bar 45, the hydraulic pressure stops and then spring 55 causes the piston head 54 to be moved upwardly and the oil to be forced out of the chamber through port 57 to the oil reservoir 69, see Figs. 2 and 14.

Figures 8, 9, 10, 11, 12:
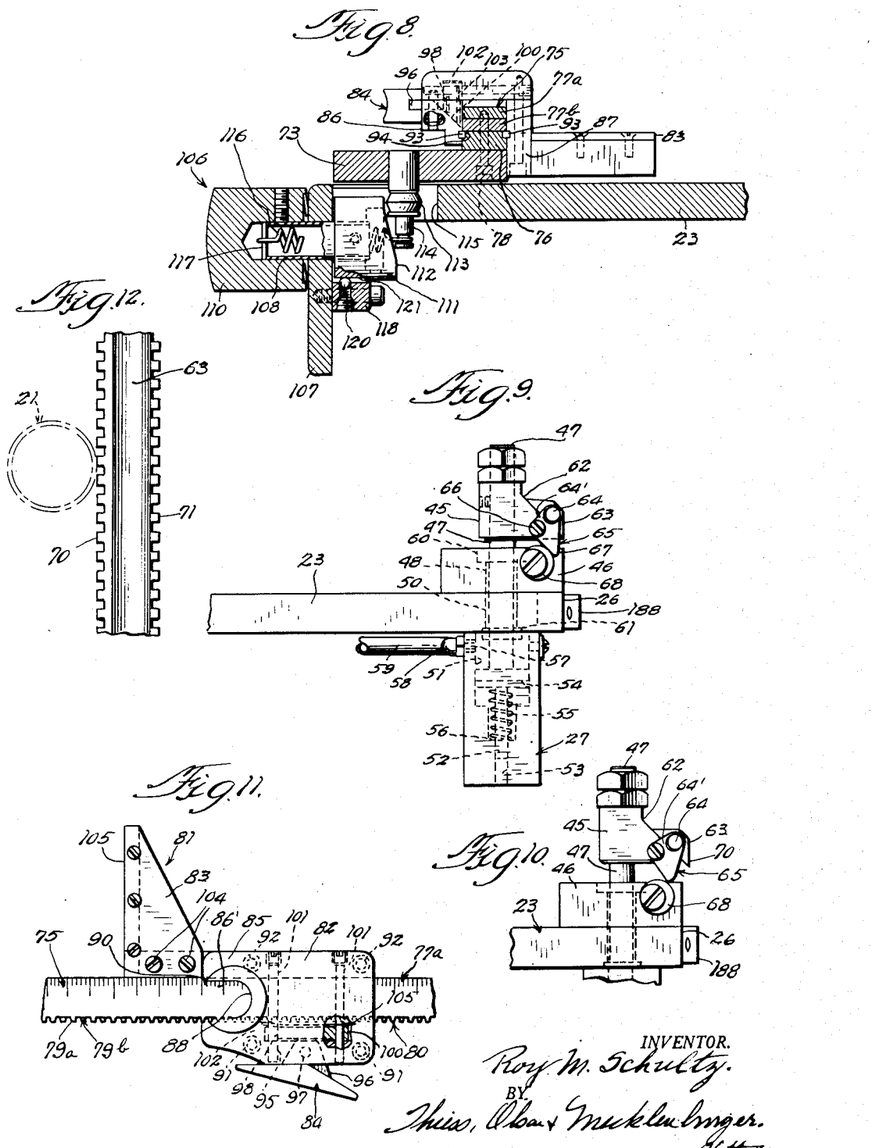
Fig. 8 is a fragmentary sectional view of the aligning means taken along line 8—8 of Fig. 3.
Fig. 9 is a fragmentary end view of the clamping means shown in its partially clamp position.
Fig. 10 is like Fig. 9 showing the clamping means in fully unclamp position.
Fig. 11 is a fragmentary plan view of the gauge device forming a part of the aligning means.
Fig. 12 is a fragmentary plan view of the sighting bar showing its relative position with respect to the cutting plane of the cutting tool, shown in dotted lines, when the clamping means is in its unclamp position.

The clamp bar 45 has side 62 thereof, adjacent cutting tool 21, incline downwardly as shown in Figs. 9 and 10. Slidably mounted on surface 62 is a sighting bar 63. At either end of the sighting bar 63 is a longitudinally extending pin 64 which engages an elongated slot 64' formed in a cam follower plate 65. The elongated slot 64' in the plate 65 prevents binding between surface 62 and bar 63 when plate 65 pivots about pin 66. Plate 65 is a triangularly-shaped piece and is pivotally mounted on the corresponding end of clamp bar 45 at pin 66. The lower portion 67 of plate 65 is adapted to slidably engage a cam 68 which is mounted on the corresponding end of rest block 46. When the clamp bar 45 is in its release or unclamp position, plate 65 is free from cam 68, see Fig. 10, thereby enabling sight bar 63, due to gravitational force, to slide downwardly on surface 62 and have the edge 70 thereof, adjacent the cutter tool 21, to project beyond the edge 26 of the top 23. The edge 70 in its projected position is disposed in the cutting plane of cutting tool 21, see Fig. 12. Thus the operator may readily determine the cutting plane of the tool. Opposite edges 70 and 71 of sighting bar 63 are notched in a like manner so that the sighting bar may be turned with either edge extending outwardly when the clamping unit 43 is being assembled. The notched edge enables the operator to more readily position the work 44 properly with respect to the cutting tool 21.

Mounted on top 23 of supporting member 22 and disposed at substantially a right angle with respect to clamp unit 43 is a work aligning unit 72. The work aligning unit comprises an elongated work abutting member 73 which is mounted on top surface 23 for pivotal movement about point 74, see Fig. 3. Mounted along the inner edge of work abutting member 73 is an elongated track 75. The track, see Fig. 8, comprises an elongated key bar 76 positioned adjacent the upper side of member 73 and a pair of elongated gauge bars 77a and b arranged in superimposed relationship with respect to bar 76. Inscribed on the upper surface of upper gauge bar 77a is a graduated scale 86', hereinafter referred to as the pica scale. A plurality of screws 78 (only one shown in Fig. 8) hold bars 76 and 77a and b securely against the upper side of member 73. One elongated edge 80 of each of the gauge bars 77a and b are serrated or notched in a like manner, however, the teeth 79a of the upper bar 77a are disposed intermediate adjacent teeth 79b of the lower bar 77b. The function of the teeth 79a and b will be described more fully later.

Slidably mounted on track 75 for movement in a longitudinal direction thereon, towards or away from edge 26 of top 23, is a gauge assembly 81. The gauge assembly comprises a track embracing member 82, an angle plate 83 mounted forwardly of member 82 towards tool 21, and a finger lever 84 rockably mounted on the operator side of the member 82.

Track embracing member 82 comprises a cover piece 85, and front and rear side pieces 86 and 87, respectively, mounted on the underside of cover piece 85 and extending downwardly therefrom, see Fig. 8. Pieces 86 and 87 are disposed substantially parallel with respect to one another. The forward end of cover piece 85 is provided with a cutout 88 and a pointer 90 which enable the operator to readily observe the pica scale and quickly set the track embracing member 82 at a predetermined position along the track. Also, the operator can accurately measure the amount of longitudinal movement of member 82 on track 75.

Front and rear side pieces are secured to cover piece 85 by screws 91 and 92, respectively. Mounted on the inner or opposing surfaces of side pieces 86 and 87 are key elements 93, which cooperate with suitable grooves 94 formed in key bar 76. The underside of lower gauge bar 77b engages the key elements 93 and holds them within the grooves 94, see Fig. 8. Thus the track-embracing member 82 is prevented from becoming disengaged from the track 75.

A slot 95 is formed in front side piece 86 through which finger lever 84 extends. Lever 84 is substantially T-shaped and has the stem portion 96 thereof pivotally mounted on pin 97 which is vertically mounted within slot 95. The end of stem portion 96 is irregularly shaped and serves as a cam for a leaf spring 98 which is positioned thereagainst. Positioned on the opposite side of spring 98 is a pawl 100, which is adapted to be moved by lever 84, through spring 98, into meshing relation with the serrated edges of gauge bars 77a and b. The upper end portion of pawl 100 is slidably mounted on a pair of parallel rods 101 which are disposed within cover piece 85 transverse with respect to track 75. A slot 102, see Fig. 8, is formed in the cover piece 85 to allow for movement of the pawl longitudinally along rods 101. Disposed within slot 102 and between rods 101 is a second leaf spring 103 which is adapted to normally unmesh the pawl from the track 75 when lever 84 is in the position shown in Fig. 11. When lever 84 is moved counterclockwise about pin 97, the cam-like end of stem portion 96 of the lever 84 exerts a pushing force on a spring 98 which in turn transmits the force to the pawl 100 whereupon the opposing force of spring 103 is overcome and the pawl meshes with the serrated edges of the gauge bars 77a and b and locks the track-embracing member 82 in place on the track 75.

Angle plate 83, as heretofore mentioned, is mounted forwardly of the cutout end of cover piece 85 and is secured to the corresponding end portion of rear side piece 87 by screws 104, see Fig. 11. The forward edge 105 of plate 85 is disposed at substantially a right angle with respect to track 75 and is adapted to abut an end of the printing plate 44 being trimmed.

To effect pivotal movement of work abutting member 73 about point 74 an adjustable cam unit 106 is provided, see Fig. 8. The cam unit is rotatably mounted on a downwardly extending apron 107 which is secured to the edge of top 23, adjacent the operator. Extending through a suitable opening formed in apron 107 is a sleeve 108. To the exposed end of sleeve 108 is secured a knob 110 for effecting rotation of the sleeve. Affixed to and over the inner end of sleeve 108 is a cam sleeve 111. The inner edge 112 of cam sleeve 111 is irregularly shaped and contacts a follower 113 which is rotatably mounted on a stud 114. The stud 114 is mounted on the underside of work abutting member 73 and extends downwardly through a cutout 115 provided in top 23. Disposed within sleeve 108 is a coil spring 116 which has one end secured to a cross piece 117 formed at the outer end of the sleeve and has the other end embracing the free end of stud 114. Thus, spring 116 assures positive engagement of follower 113 at all times with the irregular edge 112 of cam sleeve 111.

Mounted on the inner surface of apron 107 and beneath cam sleeve 111 is a detent block 118. The upper surface of block 118 is arcuate to conform to the periphery of cam sleeve 111. Disposed within detent block 118 is a spring ball 120 which is adapted to seat in a longitudinal groove 121 formed in the periphery of the cam sleeve 111. The ball 120 engages groove 121 only when the sleeve 111 is rotated to its "index position" whereupon the work abutting member 73 is positioned at substantially a right angle with respect to clamp bar 45.

The operator aligns the work 44 when work supporting member 22 is in its rest position. When member 22 is in this position the top 23 is inclined downwardly a slight amount so that the operator may quickly position the work against work abutting member 73 and the angle plate 83 of the gauge unit 81. Furthermore, with the top 23 so inclined the operator may readily view the sighting bar 63.

Figure 5:
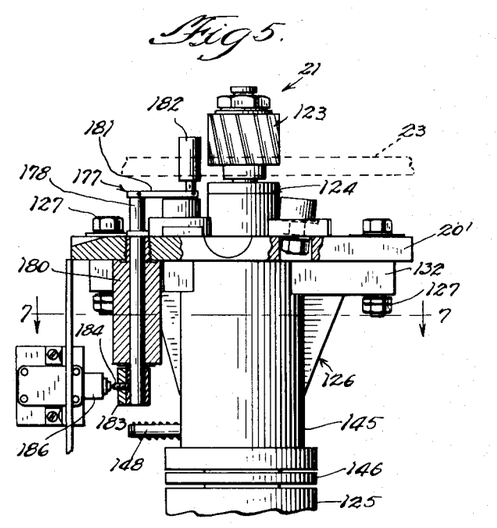
Fig. 5 is a fragmentary sectional view of the cutting tool taken along line 5—5 of Fig. 3.
Figure 6:
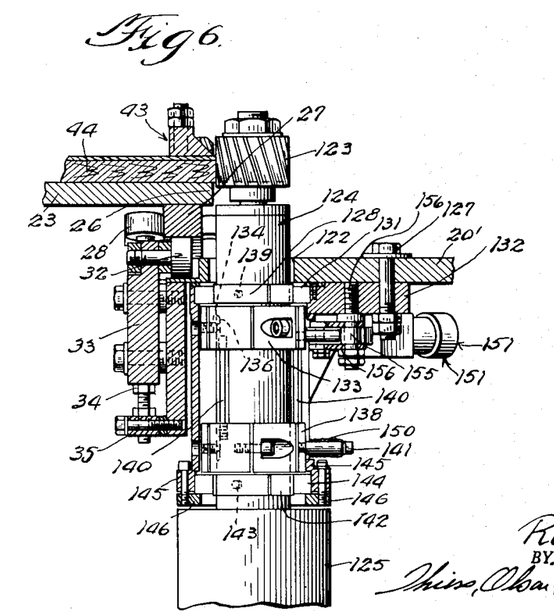
Fig. 6 is a fragmentary sectional end view of the cutting tool taken along line 6—6 of Fig. 3.
Figure 7:
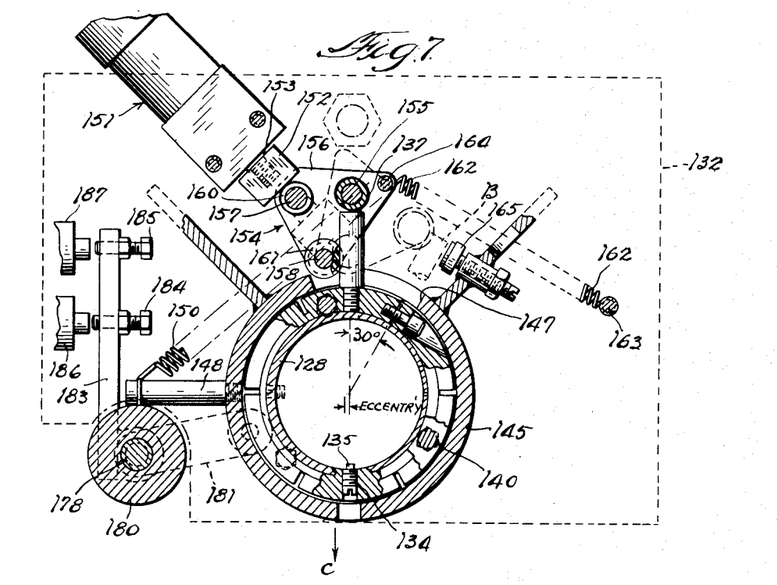
Fig. 7 is a fragmentary sectional view of the cutting tool taken along line 7—7 of Fig. 5.

The cutting tool 21, as seen more clearly in Figs. 5, 6, and 7, is arranged adjacent edge 26 of the top 23 and projects vertically through an opening 122 formed in the upper surface 20' of frame 20. The cutter 123, which forms a part of the cutting tool 21, is a conventional type milling cutter and is detachably mounted on the upper end of a spindle 124. The lower end of the spindle terminates within a housing 125 and is driven by a constant speed, unidirectional motor, not shown. The spindle 124 and housing 125 are supported by a spindle support assembly 126 which is secured to the underside of upper frame surface 20' by a plurality of bolts 127.

The support assembly 126 which is shown partially in cross section in Fig. 6 comprises an upper eccentric split ring 128 which embraces spindle 124 and is affixed thereto by a holding screw 130. The ring 128 is mounted within a bearing 131 which is seated within a suitable opening formed in support plate 132 and is held rigid with respect thereto. The support plate is bolted to the underside of upper surface 20' and forms a part of the support assembly 126. Mounted beneath ring 128 and embracing spindle 124 is a bearing preloaded collar 133, which is affixed to the periphery of spindle 124 by holding screw 134. The end 135 of screw 134 is disposed within a keyway 136 formed longitudinally in the spindle periphery. Extending radially from the outer periphery of collar 133 is a stud pin 137. Mounted on spindle 124 and spaced longitudinally beneath collar 133 is a spindle support collar 138. Spaced symmetrically about spindle 124 and between collars 133 and 138 are a plurality of collar spacing rods 140. The lower ends of the rods 140 are threaded into collar 138 and the upper ends of the rods are reduced in size and are seated within suitable openings formed in preloaded collar 133. Thus the collars 133 and 138 move as a unit about the axis of the spindle. A radially extending stud pin 141 is mounted on the outer periphery of collar 138 and in vertical alignment with respect to stud pin 137. Disposed beneath collar 138 and embracing the periphery of spindle 124 is a second eccentric split ring 142 which is secured to the spindle 124 by a holding pin 143. Eccentric rings 128 and 142 are the same shape and are arranged in the same relative position with respect to one another on the periphery of spindle 124. The lower ring 142 is likewise mounted within a bearing 144. The bearing 144 is rigidly held within a housing tube 145 by a retaining ring 146 both of which form a part of the support assembly 126. Preloading of bearings 131 and 144 is accomplished by adjustment of the spacing rods 140. Housing tube 145 encloses the eccentric rings and bearing collars and is welded to support plate 132. An elongated slot 147 is provided in tube 145 through which stud pins 137 and 141 extend. The slot 147 is sufficiently wide enough to allow the pins to traverse an arc of approximately 30°. Projecting radially from the outer periphery of tube 145 is a post 148 to which is attached at one end thereof a coil spring 150. The other end of the spring 150 is connected to stud pin 141, see Fig. 6. The purpose of spring 150 will become apparent hereinafter.

The approximate 30° arcuate movement of pins 137 and 141 is effected by a piston-cylinder assembly 151, see Fig. 6, which is secured to the underside of frame surface 20'. Positioned intermediate the exposed end 152 of the piston 153 and stud 137 is a bumper plate assembly 154 which is pivotally mounted about pin 155 extending downwardly from spindle support plate 132. The bumper plate assembly 154 comprises a pair of spaced substantially triangular-shaped plates 156, a pin 157 mounted transversely on and between said plates 156, and a second pin 158 mounted transversely on and between said plates 156. Embracing pin 157 is a sleeve 160 which is disposed intermediate the plates and is engaged by the exposed end 152 of the piston 153. Pin 158 is spaced from pin 157 and is embraced by a roller 161 which is rotatably mounted thereon and arranged intermediate plates 156. To effect positive engagement of sleeve 160 with end 152 of piston 153, a spring 162 is provided having one end thereof connected to a post 163 mounted downwardly from spindle support plate 132, and the other end connected to a third pin 164 mounted transversely on said spaced plates 156. Spring 150 heretofore described, which is connected to post 148 and stud pin 141, effects positive engagement of stud pin 137 with roller 161.

As piston 153 is extended, the bumper plate assembly 154 turns counterclockwise about pin 155 and causes the stud pin 137 and in turn the spindle 124, to rotate approximately 30° to position B as shown in dotted lines in Fig. 7. An adjustable stop 165 for stud pin 137 is provided which is mounted on support plate 132. When the stud pin 137 is in position B, it is locked in place between bumper plate assembly 154 and stop 165 and prevents the spindle from retracting while it is cutting due to vibrations and the like. Upon the spindle 124 being turned by piston 153, the eccentric rings 128 and 142 disposed within bearings 131 and 144, respectively, take effect and cause the spindle to move in a direction C approximately .015 of an inch. With the spindle moved to this position, the cutter 123 will engage the adjacent edge of the printing plate 144. After the work supporting member 22 has reached its extreme forward position A, Fig. 2, the piston 153 of piston-cylinder assembly 151 is retracted whereupon the spindle 124 returns to initial position through the force of spring 150 exerted on stud pin 141, and the cutter is retracted from the path of the work supporting member 22. The hydraulic system for actuating piston-cylinder assembly 151 will be described hereinafter.

Positioned on the operator side of the frame 20 is a control panel 166 on which is mounted control button 167 for actuating the clamp bar 45 into clamp position, button 168 for unclamping the bar 45, button 170 for starting the work supporting member 22 through its reciprocating cycle, and button 171, which is a safety button and causes the member 22 to return to its starting position regardless of where the member 22 is in its reciprocatory cycle. Indicator lights 172 and 173 are provided for indicating that the spindle motor, not shown, and the pump motor 192, respectively, are energized. The buttons are so arranged electrically that start button 170 is inoperative until clamp button 167 is depressed. Unclamp button 168 is only operative when work supporting member 22 is in rest or load position B, Fig. 2.

Arranged beneath control panel 166 is the spindle motor switch 174, the hydraulic pump motor switch 175, and a fuse box 176.

Mounted on frame upper surface 20' adjacent the cutting tool 21 and on the operator side thereof is a trip lever 177 which is adapted, when moved in a counterclockwise direction about shaft 178, to effect deceleration of the feed speed of the work supporting member or reversal in the direction of movement thereof. The lever as shown more clearly in Fig. 5 comprises a vertically extending shaft 178 which is rotatably mounted in a sleeve 180. The sleeve is fastened to the underside of surface 20'. At the upper end of shaft 178 is mounted a transversely extending arm 181. At the free end of arm 181 is mounted a vertically extending finger 182. The arm 181 extends rearwardly towards cutting tool 21 so that finger 182 is disposed adjacent the cutter 123, see Fig. 7. The finger 182 is spaced a predetermined distance from the edge 26 of top 23, see Fig. 3. To the bottom end of shaft 178 is secured a second arm 183. The arm 183 extends transversely from the shaft and is angularly positioned relative to upper arm 181, see Fig. 7. The arms 181 and 183 are mounted on the shaft 178 so that the arms and shaft rotate as a unit about the shaft as an axis.

Mounted on the free end of arm 183 are a pair of spaced adjustable screws 184 and 185. The ends of the screws are adapted to engage corresponding switches 186 and 187. The screws 184 and 185 are so adjusted that only switch 186 will be depressed upon a slight offsetting movement of finger 182. This causes the feed speed of work supporting member 22 to be decelerated. If the finger 182 is further offset switch 187 is depressed which effects reversal in the direction of movement of member 22 whereupon the member 22 returns to its initial starting or rest position. Finger 182 is offset in the first instance by the portion of the printing plate 44 which is to be trimmed by the cutter 123. If, however, the operator has carelessly positioned the plate 44 on the top 23 so that too great a portion of the plate 44 overhangs edge 26 of the top, the finger 182 will be fully offset and prevent the plate 44 from being fed past the cutter 123. This is a safety feature to prevent injury to the cutter. If the plate 44 has been properly positioned on top 23 and is fed past the cutter, the work supporting member 22 will continue to move to its extreme forward position whereupon a wedge trip 188, mounted on the operator end of edge 26, see Fig. 3, engages finger 182 and causes it to be fully offset and reverse direction of movement of member 22.

Figure 2:
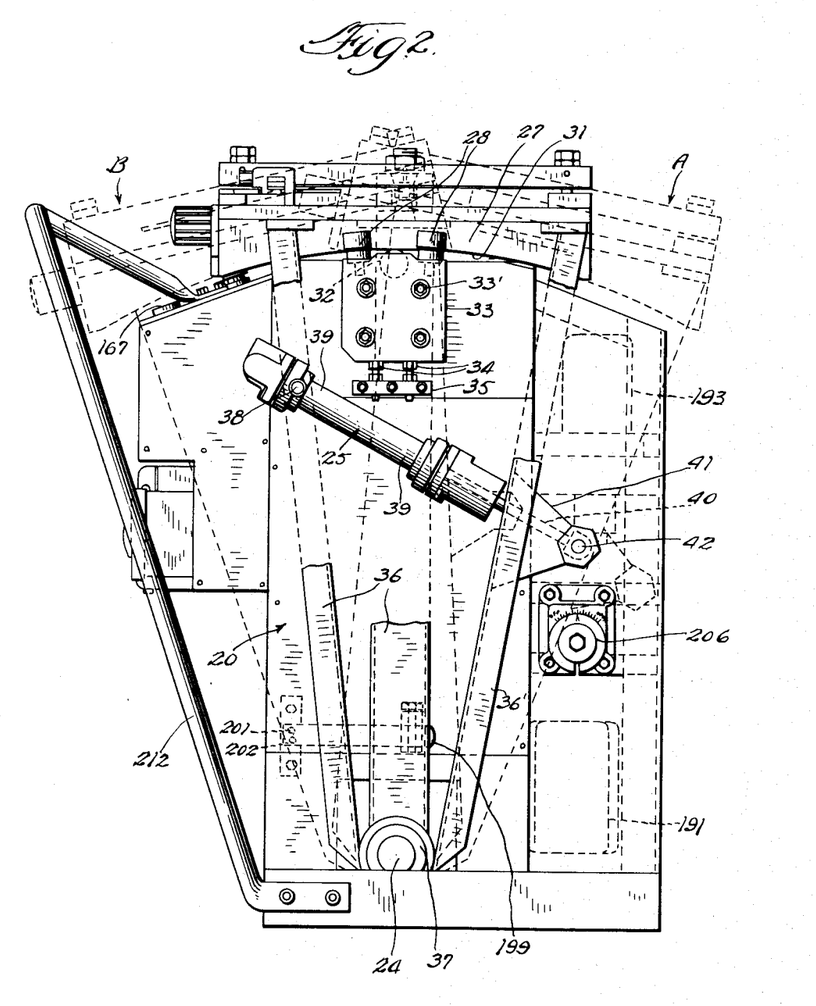
Fig. 2 is a side elevational view of the machine shown in Fig. 1. The extreme forward and rest positions of the supporting member are shown in dotted lines.
Figure 3:
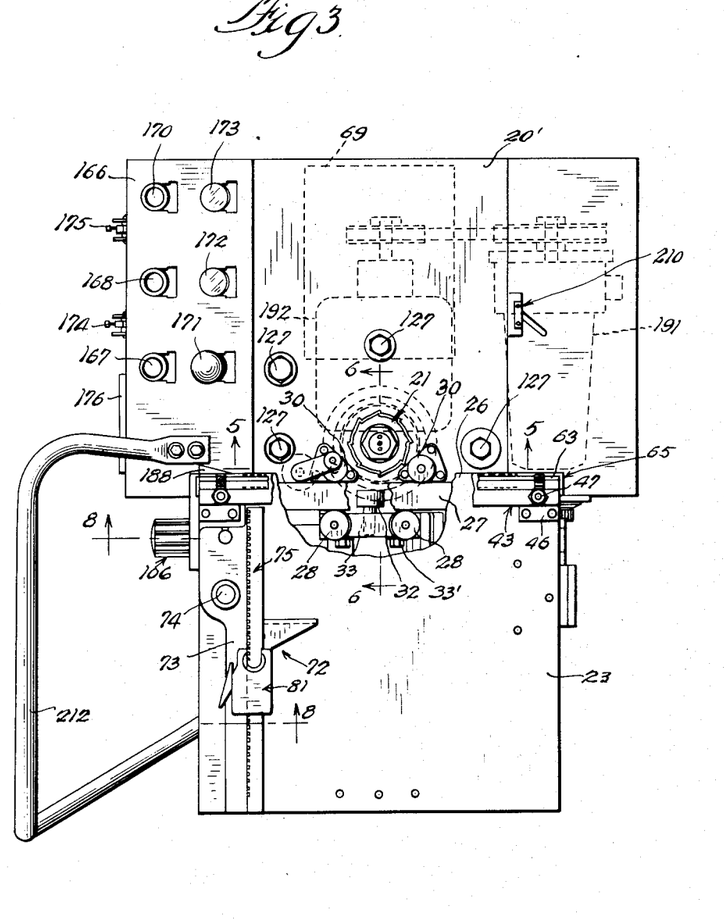
Fig. 3 is a top plan view of the machine shown in Fig. 2 with a portion of the work supporting member cut away to expose the cutting tool and associated mechanism.
Figure 4:
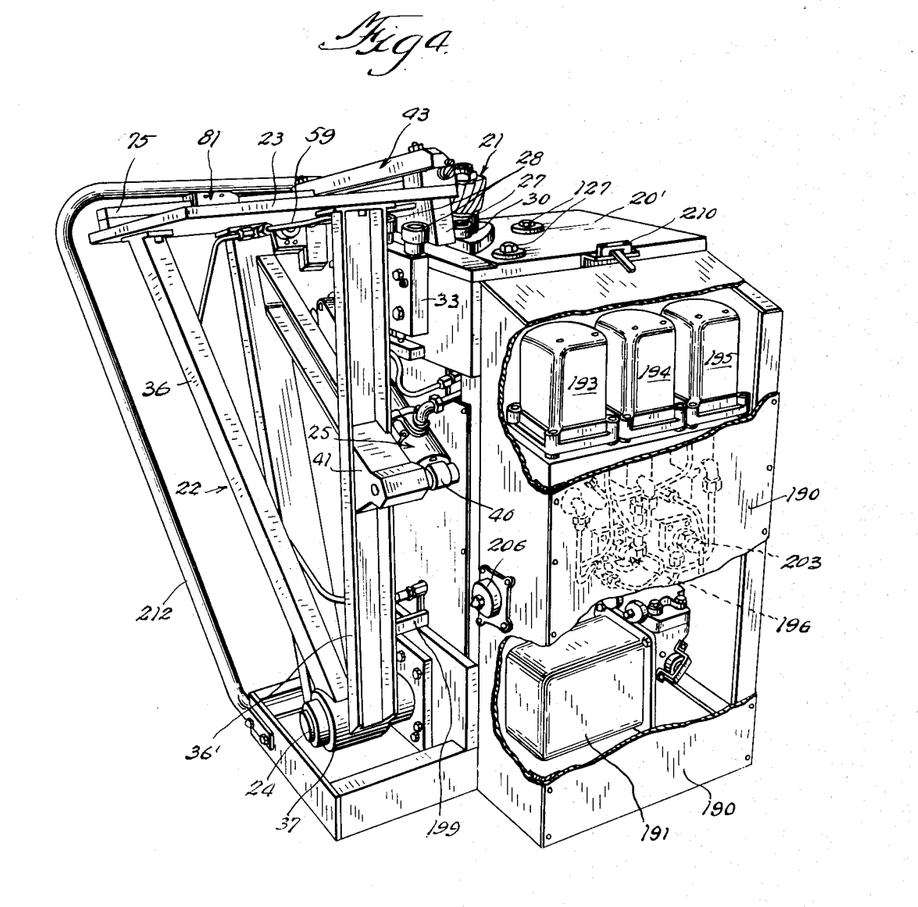
Fig. 4 is a perspective rear view of the machine with the work supporting member in its rest position and a portion of the frame housing cut away to expose part of the hydraulic system.

Disposed beneath the upper surface 20' of the frame 20 and enclosed within a suitable housing 190 are a hydraulic pump 191, a motor 192 therefor, a reservoir 69 for the hydraulic fluid, and a plurality of solenoid valves 193, 194, and 195, see Figs. 2, 3, and 4. The function of these various units will become apparent upon discussion hereinafter of the hydraulic and electrical systems.

Figure 13:
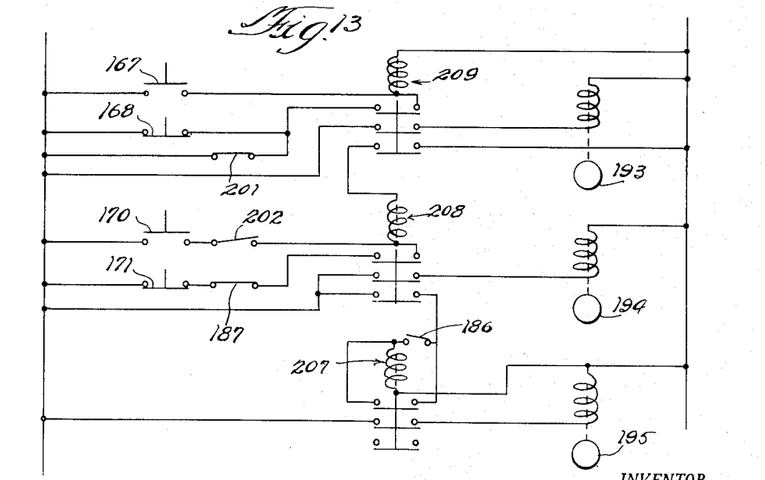
Fig. 13 is a circuit diagram of the electrical system for the machine.

To aid in the understanding of the electrical system of the machine, reference should be made to the circuit diagram shown in Fig. 13. Upon momentary depressing of clamp button 167 relay switch 209 is energized causing the three contacts thereof to close. Upon release of the clamp button 167 the relay 209 is locked in by the circuit through unclamp button 168 and the upper contacts of the relay. Switch 201 is a clamp interlock switch which is normally closed except when the work supporting member 22 is in its starting or rest position B as shown in Fig. 2. When the member 22 is in this position, brace member 36' strikes a pivotally mounted bar 199 which extends outwardly from the frame housing 190 and is adjacent hub 37 of the work supporting member, and causes switch 201 to open, see Figs. 2 and 4. Thus switch 201 is open only when member 22 is in its initial starting position. This is a safety feature to prevent unclamping of the work 44 at any other time during the cycle of operation of the work supporting member. When relay 209 is energized solenoid valve 193 is actuated causing the hydraulic fluid to pass into chamber 51 through port 57 formed in depending flange 27.

Bar 199 when struck by brace member 36' also causes the start interlock switch 202, which is normally open, to close. Thus after relay 209 has been energized and interlock switch 202 closed, relay 208 may be energized by the operator momentarily depressing start button 170. Upon relay 208 being energized the three contacts thereof are closed and the circuit to solenoid valve 194 is complete. Solenoid valve 194 causes the piston 153 of the cylinder assembly 151 to be extended and the cutter spindle 124 to move into position whereby the printing plate or work 44 may be cut by the cutter 123. Furthermore upon energizing of solenoid valve 194, the work supporting member 22 is moved forward by piston cylinder assembly 25. After start button 170 is released there is a locking in of the circuit for relay 208 through safety button 171 and overload interlock switch 187 which is normally closed. If too great a portion of the printing plate 44 overhangs the edge 26 of the top 23 the trip lever 177 will be fully offset thereby and interlock switch 187 will be opened and solenoid valve 194 in turn will be deenergized and the work supporting member 22 will return to its original starting position.

After relay 208 has been energized the circuit for energizing relay 207 is complete, upon feed speed switch 186, which is normally open, being closed. Switch 186 is closed, upon trip lever 177 being offset a slight amount by the work 44 striking finger 182 prior to being fed past cutter 123. Upon relay 207 being energized the circuit to solenoid valve 195 is complete and the forward movement of the work supporting member is decelerated in order that the cutter 123 may more readily trim the work 44.

When the member 22 has reached its extreme forward position overload interlock switch 187 will be opened by the wedge trip 188 engaging finger 182 and fully offsetting trip lever 177.

Various safety features have been incorporated in the electrical system in order to prevent injury to the machine or the plate being trimmed due to the carelessness of the operator. Briefly these features are; (a) it is necessary that relay 209 be energized before the other relays 208 and 207 may be energized (b) relay 207 in turn may only be energized when relay 208 is energized (c) the unclamp button 168 is only effective when the work supporting member 22 is in its rest position and interlock switch 201 is opened (d) the member 22 can only be started forward from its rest position when interlock switch 202 is closed by member 22 (e) an overload interlock switch 187 is provided which automatically causes member 22 to return to its rest position if the work 44 projects too far beyond the edge 26 of the top 23 (f) a safety button 171 allows the member 22 to be returned to its rest position from any point during its forward movement as desired by the operator and (g) the feed or forward speed of member 22 is automatically decelerated by switch 186 being closed, when the work 44 is being trimmed by the cutter 123.

Figure 14:
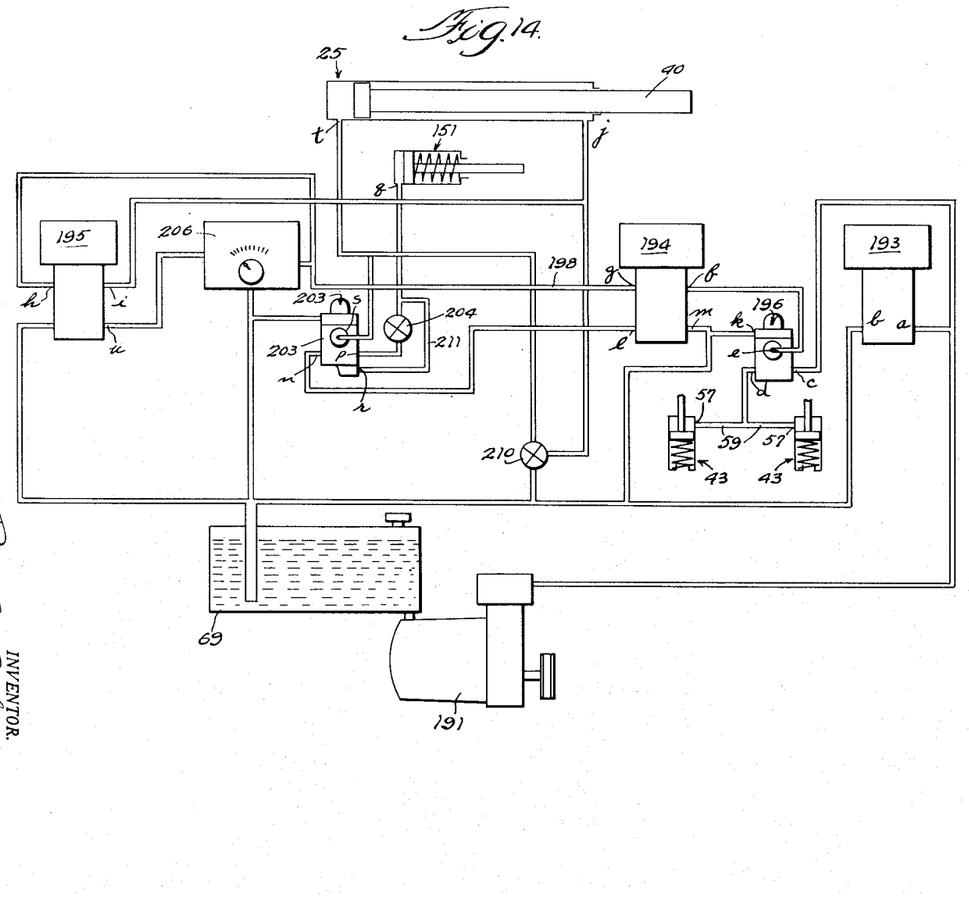
Fig. 14 is a diagrammatic view of the hydraulic system for the machine.

The hydraulic system which is of a conventional type is shown diagrammatically in Fig. 14. Upon hydraulic pump motor switch 175 being turned on minimum pressure from pump 191 is developed whereby the fluid flows through ports $a$ and $b$ in solenoid valve 193 and returns to reservoir 69. Upon solenoid valve 193 being energized port $a$ thereof is shut off and the fluid flows to port $c$ of selector valve 196 and out through port $d$ to the cylinders of the clamping device 43. After the clamp cylinders have been actuated pressure is developed in selector valve 196 until the fluid passes through port $e$ thereof. The fluid, thereupon, enters solenoid valve 194 at port $f$ and leaves valve 194 at port $g$. Valve 194 at this point has not been energized. The fluid flows from port $g$ of valve 194 to port $h$ of solenoid valve 195 and out through port $i$ thereof. Valve 195 is likewise not energized. The fluid flows from port $i$ of valve 195 to the port $j$ on the return side of cylinder assembly 25 and causes the work supporting member 22 to be in its proper rest position so that interlock switch 201 will be open and interlock switch 202 will be closed. If unclamp button 168 is depressed, ports a and b of solenoid valve 193 are opened and the pressure in the clamp cylinders is released from port d of selector valve 196 and out through port k thereof to reservoir 69.

Upon solenoid valve 194 being energized by depressing of start button 170 by the operator, after the clamp solenoid valve 193 has been energized and interlock switch 202 has been closed, the flow through valve 194 is from port f to port l thereof. Simultaneously there is a discharge flow of fluid from port g through port m in valve 194 to reservoir 69. The high pressure fluid flows from port l of valve 194 to port n of a second selector valve 203. The high pressure fluid flows from port n to port p of valve 203 and through flow valve 204 to port q in cylinder 151, whereupon the cutter spindle 124 is moved into cutting position towards top 23. After the spindle 124 has been moved to its cutting position and the pressure in cylinder 151 has increased a sufficient amount, the flow of the fluid through flow valve 204 to cylinder 151 is blocked and the fluid continues to flow through a by-pass tube 211 and into port r of selector valve 203. Upon the fluid returning through port r, port s of valve 203 is opened and the high pressure fluid flows to port t of cylinder 25 and the piston 49 is extended whereupon the work supporting member 22 is moved forward. At this point solenoid valve 194 has been energized so as to allow the fluid in the return side of cylinder to flow out through port j thereof through ports i and h of valve 195 and out through ports g and m of valve 194 to the reservoir 69.

When the work supporting member 22 has advanced to a point where the work 44 causes the trip lever 177 to be offset a slight amount, switch 186 is closed thereupon solenoid valve 195 is energized causing flow from the return side of cylinder 25 through ports i to h to be directed instead from port i to port u of valve 195. From port u the return fluid flows through regulating valve 206 and from there to port g of solenoid valve 194 and out through port m to reservoir 69. The regulating valve 206 is so adjusted to retard the flow of the fluid through port j of cylinder 25 and thereby decelerate the advance or forward movement of supporting member 22. When member 22 reaches its extreme forward position or the work 44 projects too far beyond the edge 26 of the top 23 of member 22, trip lever 177 is fully offset and switch 187 is opened causing solenoid valves 194 and 195 to be de-energized thus causing the flow of the fluid to be reversed and flow into the return side of cylinder 25 through port j and out through port t thereof.

To prevent the operator from being struck by the work supporting member 22 on its return stroke, a guard rail 212 has been mounted on the front or operator side of the machine.

If the operator desires to move the supporting member 22 forward manually, a hand operated control valve 210 has been provided, see Figs. 4 and 14 which when open or in its manual position equalizes hydraulic pressure on both sides of actuating piston 44 of cylinder assembly 25. Manual movement of member 22 might be advantageous in certain instances when properly positioning the work 44 with respect to the cutter 123.

As a further protection to the operator, the cutter 123 may be partially enclosed by a hood, not shown, which in turn could be connected to an exhaust unit, not shown, and thereby cause the cuttings and shavings from the plate to be removed. Also to aid the operator in properly aligning the edge of the plate with the notched edge of the sighting bar 63, a magnifying device, not shown, could be mounted on surface 20' and project above and over edge 26 of top 23 when member 22 is in its rest position.

Thus it will be seen a trimming machine has been provided which causes any burr, if formed, on the plate when cut, to be directed away from the printing surface of the plate and thereby eliminate the need for removing the burr by the operator prior to the plate being mounted for use on a printing press. Furthermore the cutting life of the cutter has been increased because the cutting load has been more evenly distributed over the periphery of the cutter. Accuracy and speed in trimming the plate to its predetermined size has been greatly facilitated and increased by the improved work-aligning mechanism and the positioning of the top when the work supporting member is in its rest position. Numerous foolproof safety devices and features have been incorporated in the machine for the protection of the operator, plate being trimmed, and the machine as well.

While a particular embodiment of this invention is shown above, it will be understood, of course, that the invention is not to be limited thereto, since many modifications may be made, and it is contemplated, therefore, by the appended claims, to cover any such modifications as fall within the true spirit and scope of this invention.

I claim:

1. A device of the class described comprising a frame, an elongated cutter element mounted upright on said frame for rotation about its longitudinal axis, and a work supporting member mounted on said frame at a point beneath said cutter element for forward and rearward movement about an axis disposed transverse with respect to the longitudinal axis of said cutter element, and means mounted on said frame and operatively connected to said cutter element and work-supporting member to effect adjustment of said cutter element in a direction transverse with respect to the axis of rotation thereof whereby said cutter element contacts the supported work only upon forward movement of said member.

2. A device of the class described comprising a frame, an elongated cutter element mounted on said frame for rotation about its longitudinal axis, a work supporting member having a substantially flat top, pivotally mounted on said frame, actuating means mounted on said frame for effecting oscillatory movement about an axis disposed transverse with respect to the longitudinal axis of said cutter element, and work-clamping means mounted on said top and operatively connected to said actuating means whereby the latter is inoperative when said work clamping means is in unclamping relation.

3. A device of the class described comprising a frame, an upright elongated cutter element mounted on said frame for rotation about its longitudinal axis, a work supporting member having a substantially flat top, pivotally mounted on said frame for oscillatory movement about an axis disposed transverse with respect to the longitudinal axis of said cutter element, and work clamping means mounted on said top and operatively connected to said work-supporting member whereby the latter is rendered immovable when said clamping means is in an unclamped relation.

4. A device of the class described comprising a frame, an upright elongated cutter element mounted on said frame for rotation about its longitudinal axis, a work supporting member mounted on said frame beneath said cutter element for oscillatory movement about an axis disposed transverse with respect to the longitudinal axis of said cutter element, said supporting member having a substantially flat top and the edge thereof adjacent said cutter element being provided with a depending flange, and guide means mounted on said frame cooperating with opposite surfaces of said flange for effecting non-axial movement of said supporting member.

5. A device of the class described comprising a frame, an upright elongated cutter element mounted on said frame for rotation about its longitudinal axis, a work supporting member pivotally mounted on said frame beneath said cutter element for oscillatory movement about an axis disposed transverse with respect to the longitudinal axis of said cutter element, said supporting member having a substantially flat top and the edge thereof adjacent said cutter element being provided with a depending flange having an arcuate undersurface, and adjustable guides mounted on said frame adjacent said cutter element and engaging the depending surfaces and arcuate undersurface of said flange for effecting arcuate movement of said top edge adjacent said cutter element in a plane substantially parallel to the rotatable axis of said cutter element.

6. A device of the class described comprising a frame, an elongated cutter element mounted on said frame for rotation about its longitudinal axis, a work supporting member having a substantially flat top, mounted on said frame for movement in a path arcuate with respect to a line disposed transverse to the longitudinal axis of said cutter element, and work clamping means mounted on said top; said means comprising an adjustable clamp member disposed in a plane parallel to a tangential plane of said cutter element, a sighting device mounted on said clamp member for relative movement with respect thereto and adapted when in one position to have a portion thereof disposed in said tangential plane and when in a second position to be retracted from said tangential plane.

7. A device of the class described comprising a frame, a cutter element rotatably mounted on said frame, a work supporting member having a substantially flat top, mounted on said frame for movement in a path arcuate with respect to a line disposed transverse to the axis of rotation of said cutter element, and work clamping means mounted on said top; said means comprising a clamp member adjustably mounted on said top for movement in a plane transverse with respect to said top, and a sighting device mounted on said clamp member for relative movement with respect thereto and adapted, when said clamp member is in an unclamp position, to have a portion of said device disposed within a plane tangential with respect to said cutter element, and when said clamp member is in a clamp position, to have said portion spaced from said tangential plane.

8. A device of the class described comprising a frame, a cutter element rotatably mounted on said frame, a work supporting member having a substantially flat top, mounted on said frame for movement in a path arcuate with respect to a line disposed transverse to the axis of rotation of said cutter element, and work clamping means mounted on said top, said means comprising an elongated clamp member mounted on said top for movement transverse with respect thereto to clamp and unclamp positions, and an elongated sighting device superimposed and slidably mounted on said clamp member and adapted, when said clamp member is in the unclamp position, to have one edge of said device disposed within the cutting plane of said cutter element and when said clamp member is in the clamp position to have said one edge retracted from said cutting plane.

9. A device of the class described comprising a frame, a cutter element rotatably mounted on said frame, a work supporting member having a substantially flat top, mounted on said frame for movement in a path arcuate with respect to a line disposed transverse to the axis of rotation of said cutter element, and work clamping means mounted on said top, said means comprising an elongated clamp member mounted on said top for transverse movement with respect thereto and disposed in a plane parallel to the cutting plane of said cutter element, and an elongated sighting device mounted on said clamp member for relative movement with respect thereto, said device having an edge thereof notched and parallel to said cutting plane, said notched edge being disposed within said cutting plane when said clamp member is in an unclamp position.

10. A device of the class described comprising a frame, an elongated cutter element mounted on said frame for rotation about its longitudinal axis, a work supporting member having a substantially flat top, mounted on said frame for movement in a path arcuate with respect to a line disposed transverse to the longitudinal axis of said cutter element, and work clamping means mounted on said top, said means comprising an elongated clamp member mounted on said top for transverse movement with respect thereto and disposed parallel to a plane tangential with respect to said cutter element, the length of said clamp member being substantially the same as the length of the side of said top adjacent said cutter element, and an elongated sighting device mounted on said clamp member for movement relative thereto, the length of said sighting device being substantially the same as the length of said clamp member, said device having one edge thereof disposed tangentially with respect to said cutter element when said clamp member is in an unclamp position and having said one edge thereof retracted from said cutter element when said clamp member is in a clamp position.

11. A device of the class described comprising a frame, an elongated cutter element mounted on said frame for rotation about its longitudinal axis, a work supporting member having a substantially flat top mounted on said frame beneath said cutter element for oscillatory movement in a plane substantially tangential to said cutter element, work clamping means mounted on said top, and work aligning means mounted on said top and cooperating with said clamping means, said work aligning means comprising an elongated work abutting element positioned substantially transverse with respect to said plane and mounted on said top for relative movement with respect to said top, an elongated track member mounted on said abutting element, and a work-engaging gauge device mounted on said track member for movement in a direction substantially transverse with respect to the tangential plane of said cutter element.

12. A device of the class described comprising a frame, a vertically extending cutter element mounted on said frame for rotation about its vertical axis, a work supporting member having a substantially flat top pivotally mounted on said frame for oscillatory movement with respect to said cutter element, the edge of said top adjacent said cutter element being movable in a plane parallel to the cutting plane of said cutter element, an elongated work clamping means mounted on said top and disposed substantially parallel to the edge of said top adjacent the cutter element, and adjustable work aligning means mounted on said top, said aligning means comprising an elongated work abutting element slidably mounted on said top and adapted to assume various positions of angular adjustment relative to the edge of said top adjacent the cutter element, an elongated track member superimposed on said abutting element, and a work-engaging gauge device adjustably mounted on said track element and adapted to assume various positions of longitudinal adjustment on said track element.

13. A device of the class described comprising a frame, a vertically extending cutter element mounted on said frame for rotation about its vertical axis, a work supporting member having a substantially flat top pivotally mounted on said frame for oscillatory movement in a plane substantially parallel to the tangential plane of said cutter element, an elongated work clamping means mounted on said top and disposed substantially parallel to said tangential plane, and adjustable work aligning means mounted on said top, said aligning means comprising an elongated work abutting element pivotally mounted on said top for slidable movement with respect thereto, a control element mounted on said work supporting member for effecting pivotal movement of said abutting element to various positions of angular adjustment relative to said tangential plane, an elongated track member superimposed on said abutting element, and a work-engaging gauge device adjustably mounted on said track element for relative longitudinal movement thereon.

14. A device of the class described comprising a frame, a vertically extending cutter element mounted on said frame for rotation about its vertical axis, a work supporting member having a substantially flat top pivotally mounted on said frame for oscillatory movement in a plane substantially parallel to the tangential plane of said cutter element, an elongated work clamping means mounted on said top and disposed substantially parallel to said tangential plane, and adjustable work aligning means mounted on said top, said aligning means comprising an elongated work abutting element slidably mounted on said top and adapted to assume various positions of angular adjustment relative to said tangential plane, an elongated track member having a plurality of longitudinally spaced notches formed in one side thereof superimposed on said work abutting element, and a gauge device adjustably mounted on said track member for selective engagement with said notches and adapted to assume various spaced positions relative to said tangential plane.

15. A device of the class described comprising a frame, an elongated cutter element mounted on said frame for rotation about its longitudinal axis, a work supporting member having a substantially flat top pivotally mounted on said frame, the edge of said top adjacent said cutter element being substantially straight and tangential to said cutter element, power actuating means for effecting forward and rearward movement of said work supporting member and said top past said cutter element in a path arcuate with respect to a line at substantially a right angle to the longitudinal axis of said cutter element, and safety means cooperating with said actuating means, mounted on said frame, intermediate said cutter element and the initial starting position of the supported work for engagement with said supported work upon forward movement of said work supporting member when said work is projecting beyond said edge of said top a predetermined distance, and cause said work supporting member to move rearwardly and said supported work to return to its initial starting position.

16. A device of the class described comprising a frame, an elongated cutter element mounted on said frame for rotation about its longitudinal axis, a work supporting member, having a substantially flat top disposed transverse with respect to said longitudinal axis, pivotally mounted on said frame for oscillatory movement about an axis disposed transverse with respect to said longitudinal axis, the edge of said top adjacent said cutter element generating a plane substantially parallel to the longitudinal axis of said cutter elements, and adjustable work clamping means mounted on said top, said means being adjustable to unclamping relation only when said work supporting member is at one terminal of oscillatory motion.

17. A device of the class described comprising a frame, a cutter element rotatably mounted on said frame, a work supporting member pivotally mounted on said frame for movement in a forward and rearward direction from an initial starting position whereby a point on said work-supporting member generates a plane substantially parallel to the rotational axis of said cutter element, and means mounted on said frame and operatively connected to said work-supporting member for effecting return of the latter to said initial starting position from any position of forward pivotal movement.

18. A device of the class described comprising a frame, a cutter element mounted on said frame for rotation about its longitudinal axis, a work supporting member pivotally mounted on said frame, actuating means mounted on said frame for effecting forward and rearward movement of said supporting member about an axis disposed transverse with respect to said longitudinal axis, and means mounted on said frame and operatively connected to said actuating means for effecting deceleration of the forward movement of said work supporting member upon said supported work being engaged by said cutter element.

19. A device of the class described comprising a frame, a cutter element rotatably mounted on said frame, a work-supporting member mounted on said frame for oscillatory movement about an axis disposed transverse to the axis of rotation of said cutter element, a point on said work-supporting member generating a plane disposed substantially parallel with respect to the axis of rotation of said cutter element, and means mounted on said frame and operatively connected to said cutter element and work-supporting member for effecting increase in the lateral distance between said generated plane and said cutter element axis upon movement of said work-supporting member in only one direction of oscillatory motion and decreasing said lateral distance upon movement of said work-supporting member in the opposite direction of oscillatory motion.

20. A device of the class described comprising a frame, a cutter element rotatably mounted on said frame, a work-supporting member mounted on said frame for oscillatory movement about an axis disposed transverse with respect to the axis of rotation of said cutter element, and means mounted on said frame and operatively connected to said cutter element and work-supporting member to effect movement of said cutter element transversely of the axis of rotation thereof whereby contact between said cutter element and the supported work results when said work-supporting member is moving in only one direction of oscillatory motion.

21. A device of the class described comprising a frame, a cutter element mounted on said frame for rotation about a substantially vertical axis, and adjustable in a substantially horizontal direction, a work-supporting member mounted on said frame beneath said cutter element for oscillatory movement about a substantially horizontal axis, and means mounted on said frame and operatively connected to said cutter element and work-supporting member to effect adjustment of said cutter element whereby contact between said cutter element and the supported work results when said work-supporting member is moving in only one direction of oscillatory motion.

22. A work-trimming machine comprising a frame, an elongated cutter element mounted on said frame for rotation about its longitudinal axis, and a work-supporting member mounted on said frame for oscillatory movement about an axis disposed transverse to the longitudinal axis of said cutter element whereby a plane, generated by a point on the surface of the supported work to be trimmed by said cutter element, is disposed substantially tangential with respect to the periphery of said cutter element when the latter is in a state of rotation; said point, on the supported work being trimmed, traversing a substantial portion of the longitudinal dimension of said cutter element upon movement of said supporting member.

23. A work-trimming machine comprising a frame, an elongated cutter element mounted on said frame for rotation about its longitudinal axis, a member having a substantially flat work-supporting surface mounted on said frame for oscillatory movement about an axis disposed transverse to the rotatable axis of said cutter element whereby a point, on the surface of the supported work to be trimmed by said cutter element, generates a plane disposed substantially tangential with respect to the periphery of said cutter element, and work-clamping means mounted on said work-supporting surface; said point, on the supported work being trimmed, traversing a substantial portion of the longitudinal dimension of said cutter element upon movement of said supporting member.

ROY M. SCHULTZ.

References Cited in the file of this patent

UNITED STATES PATENTS

| Number | Name | Date |
|---|---|---|
| 596,429 | Smith | Dec. 28, 1897 |
| 737,251 | Leethem | Aug. 25, 1903 |
| 1,625,049 | Oliver | Apr. 19, 1927 |
| 2,064,172 | Lofstedt | Dec. 25, 1936 |
| 2,141,191 | Lundberg et al. | Dec. 27, 1938 |
| 2,301,028 | Esch | Nov. 3, 1942 |
| 2,414,574 | Williams | Jan. 21, 1947 |
| 2,445,433 | Holmstrom | July 20, 1948 |
| 2,485,858 | Boykin | Oct. 25, 1949 |

FOREIGN PATENTS

| Number | Country | Date |
|---|---|---|
| 198,097 | Germany | May 5, 1908 |